United States Patent [19]

Iimori

[11] 4,439,118
[45] Mar. 27, 1984

[54] ORBITING FLUID DISPLACEMENT APPARATUS WITH COUNTERWEIGHT ATTACHMENT

[75] Inventor: Takayuki Iimori, Isesaki, Japan

[73] Assignee: Sanden Corporation, Japan

[21] Appl. No.: 318,313

[22] Filed: Nov. 4, 1981

[30] Foreign Application Priority Data

Nov. 10, 1980 [JP] Japan .......................... 55-161094[U]

[51] Int. Cl.³ .......................... F01C 1/02; F01C 21/00
[52] U.S. Cl. ........................................ 418/55; 418/151
[58] Field of Search .................................. 418/54-60, 418/61 R, 61 A, 61 B, 151

[56] References Cited

U.S. PATENT DOCUMENTS

| | | | |
|---|---|---|---|
| 801,132 | 10/1905 | Creux | 418/55 |
| 1,906,142 | 4/1933 | Ekelof | 418/55 |
| 3,884,599 | 5/1975 | Young et al. | 418/55 |
| 3,924,977 | 12/1975 | McCullough | 418/55 |
| 3,986,799 | 10/1976 | McCullough | 418/55 |
| 3,994,633 | 11/1976 | Shaffer | 418/55 |
| 3,994,635 | 11/1976 | McCullough | 418/55 |
| 3,994,636 | 11/1976 | McCullough et al. | 418/55 |
| 4,065,279 | 12/1977 | McCullough | 418/55 |
| 4,082,484 | 4/1978 | McCullough | 418/55 |

Primary Examiner—John J. Vrablik
Attorney, Agent, or Firm—Banner, Birch, McKie & Beckett

[57] ABSTRACT

A scroll type fluid displacement apparatus, in particular, a compressor of an orbiting piston type is disclosed. The compressor includes a housing with a fluid inlet port and a fluid outlet port. A fixed scroll member with first end plate and first spiral element is fixed relative to the housing. An orbiting scroll member with second end plate and second spiral element is disposed for orbiting motion in the housing. The first and second spiral elements interfit with one another at an angular and radial offset to make a plurality of line contacts to define at least one pair of sealed off fluid pockets. A drive pin is eccentrically disposed at an inner end of the drive shaft. The orbiting scroll member has a boss which rotatably supports a bushing. An eccentric hole is formed in the bushing and the drive pin is received within this hole. The center of drive pin is located on an opposite side to the center of the drive shaft with regard to a straight line, which passes through the center of the bushing and is perpendicular to a connecting line passing through the center of the drive shaft and the center of the bushing. The center of the drive pin is also beyond the connecting line in the direction of rotation of the drive shaft. A separate balance weight is attached to the bushing at its end surface by a fastener which can limit the amount of swing angle of bushing. The balance weight cancels a centrifugal force which arises because of the orbital motion of the scroll and the bushing.

4 Claims, 11 Drawing Figures

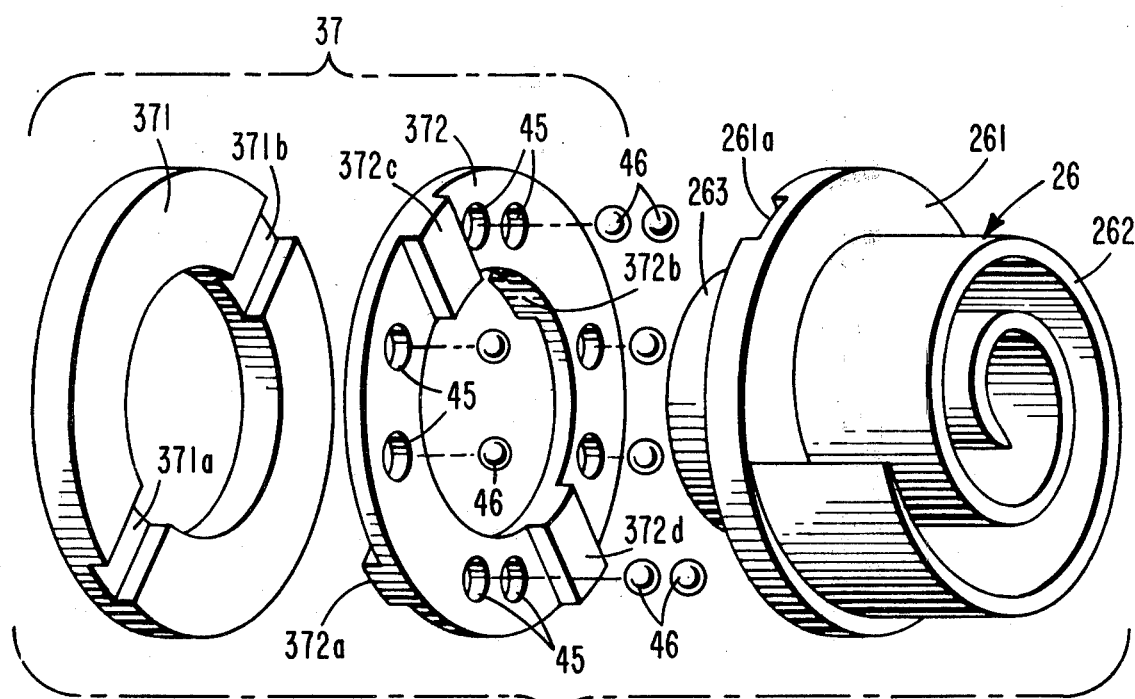
FIG. 4
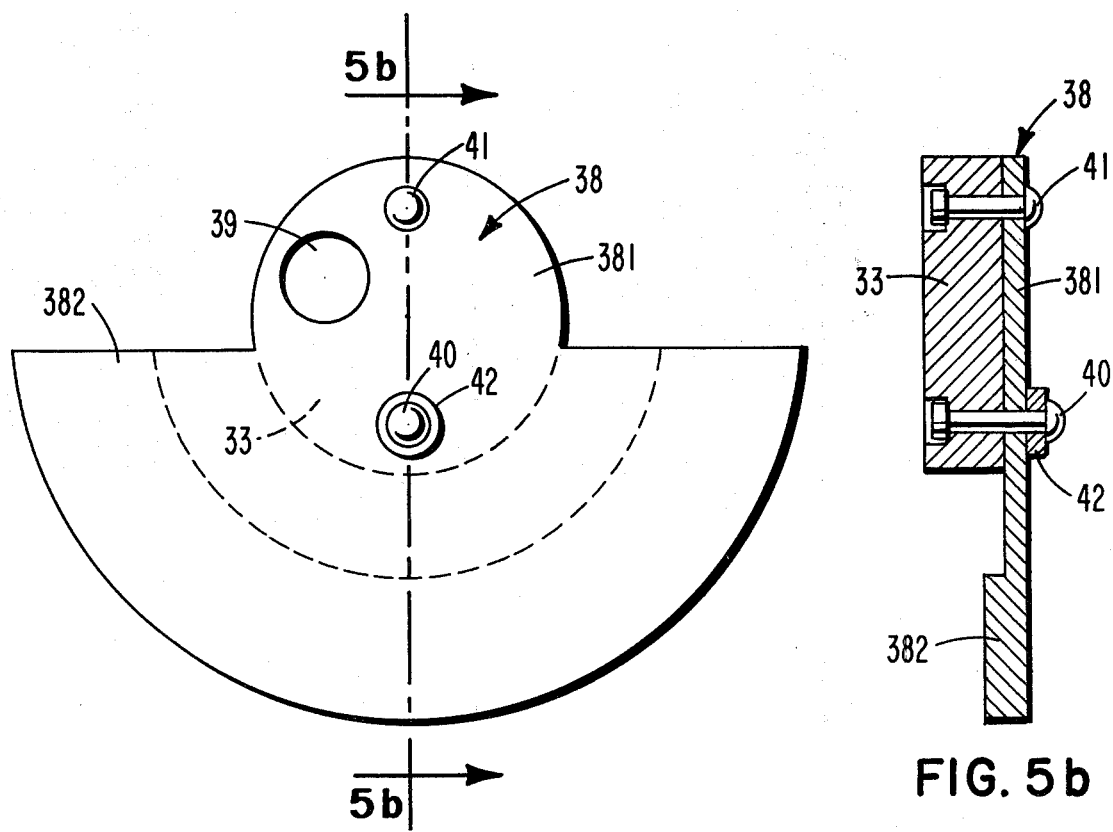
FIG. 5a
FIG. 5b

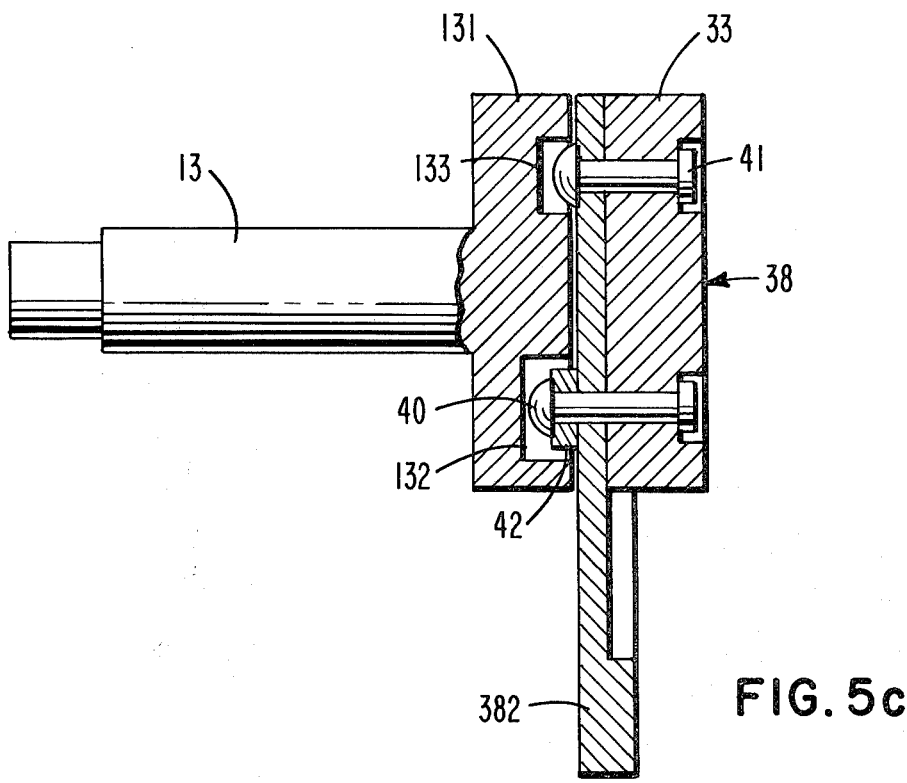
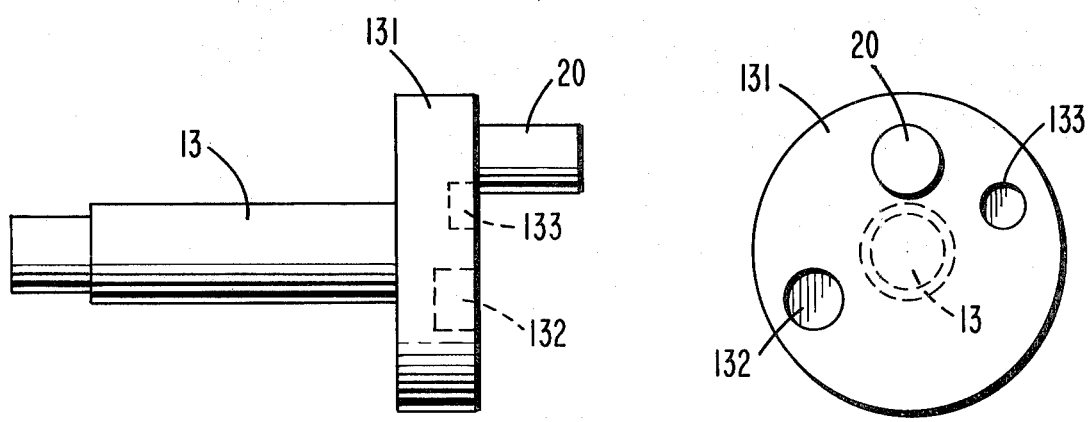

ORBITING FLUID DISPLACEMENT APPARATUS WITH COUNTERWEIGHT ATTACHMENT

BACKGROUND OF THE INVENTION

This invention relates a rotary fluid displacement apparatus, more particularly, to a fluid compressor or pump of the type which utilizes an orbiting piston member.

There are several types of fluid displacement apparatus which utilize an orbiting piston or fluid displacing member driven by a Scotch yoke type shaft coupled to an end surface of the piston or member. One apparatus, disclosed in U.S. Pat. No. 1,906,142 to John Ekelof, is a rotary machine provided with an annular, eccentrically movable piston adapted to act within an annular cylinder provided with a radial transverse wall. One end of wall of the cylinder is fixedly mounted and the other wall consists of a cover-disc connected to the annular piston, which is driven by a crank shaft. Other prior art apparatus are shown in U.S. Pat. Nos. 801,182 and 3,560,119. Though the present invention applies to either type of fluid displacement apparatus, i.e., using either an annular piston or scroll-type piston, description will be limited to the scroll type compressor. The term piston is used generically to describe a movable member of any suitable configuration, within a fluid displacement apparatus.

U.S. Pat. No. 801,182 discloses a scroll type apparatus including two scroll members each having a circular end plate and a spiroidal or involute spiral element. The scroll members are maintained angularly and radially offset so that both spiral elements interfit at a plurality of line contacts between their spiral curved surfaces to thereby seal off and define at least one pair of fluid pockets. The relative orbital motion of these scroll members shifts the line contact along the spiral curved surfaces and, therefore, changes the volume in the fluid pockets. The volume of the fluid pockets increases or decreases dependent on the direction of the orbital motion. Therefore, the scroll type fluid displacement apparatus is applicable to compress, expand or pump fluids. In comparison with conventional compressors of the piston type, a scroll type compressor has certain advantages such as fewer number of parts and continuous compression of fluid. However, there have been several problems, primarily sealing of the fluid pocket, wearing of the spiral elements, and outlet and inlet porting.

Although various improvements in the scroll type fluid displacement apparatus have been disclosed in many patents, for example, U.S. Pat. Nos. 3,884,599, 3,994,633, 3,664,635, and 3,944,636, such improvements have not sufficiently resolved these and other problems.

In particular, it is desired that sealing force at the line contact be sufficiently maintained in a scroll type fluid displacement apparatus, because the fluid pockets are defined by the line contacts between two spiral elements which are interfitted together, and the line contacts shift along the surface of the spiral elements by the orbital motion of scroll member, to thereby move the fluid pockets to the center of the spiral elements with consequent reduction of volume, and compression of the fluid in the pockets. On the other hand, if contact force between the spiral element becomes too large in maintaining the sealing of line contact, wear of spiral element surface increases. In view of this, contact force of both spiral elements must be suitably maintained. However, these contact forces can not be precisely maintained because of dimensional errors in manufacturing of the spiral elements. To decrease dimensional errors of spiral elements during manufacture, would unduly complicate the manufacture of the spiral elements.

The problem of sealing the fluid pockets is not completely resolved by the above mentioned patents.

SUMMARY OF THE INVENTION

It is a primary object of this invention to provide an improvement in a fluid displacement apparatus which has excellent sealing of fluid pockets and anti-wearing of piston elements surfaces.

It is another object of this invention to provide a fluid displacement apparatus which is simple in construction and production while accomplishing the above described object.

An orbiting piston type fluid displacement apparatus according to this invention includes a housing having a fluid inlet port and fluid outlet port. A fixed member is fixedly disposed relative to the housing and has a first piston element extending into the interior of the housing. An orbiting piston member has a second piston element. The first and second piston elements interfit to make a plurality of line contacts to define at least one of sealed off fluid pocket. A drive shaft is rotatably supported by the housing and is provided with a drive pin which is connected to the orbiting piston member for transmitting orbital motion to the orbiting piston member. A rotation preventing means is disposed in the housing for preventing the rotation of the orbiting piston member during the orbital motion of the orbiting piston member. Therefore, the fluid pocket changes volume due to the orbital motion of the orbiting piston member. The orbiting piston member has a boss. A bushing is rotatably supported in the boss. An eccentric hole is formed in an end surface of bushing. The drive pin is inserted in the eccentric hole. The bushing is thereby rotatably supported by the drive pin. A center of the drive pin is located on an opposite side to a center of the drive shaft with regard to a straight line, which passes through the center of the bushing and is perpendicular to a connecting line passing through the center of the drive shaft and the center of the bushing. The center of the drive pin is also beyond the straight line which passes through the center of the drive shaft and the center of the bushing in the direction of the rotation of the drive shaft. The bushing has a balance weight for cancelling centrifugal force which arises by the orbiting motion of the orbiting parts. The balance weight is formed separately from the bushing and is fixed to an axial end surface of the bushing by a plurality of rivits.

The rivets project from the end surface of the balance weight and the axial end surface of the drive shaft is formed with indentations for receiving the rivets to thereby restrict to turning angle scope of the bushing around the drive pin.

Further objects, features and other aspects of this invention will be understood from the following detailed description of the preferred embodiments of this invention referring to the annexed drawings. The description relates to a scroll type compressor for the sake of convenience, but the invention is not limited to scroll type compressors.

BRIEF DESCRIPTION OF THE DRAWINGS

FIG. 4 is an exploded perspective view of a rotation preventing mechanism in the embodiment of FIG. 1;

FIG. 5(a) is a side view of the bushing and balanceweight according to one embodiment of this invention;

FIG. 5(b) is a sectional view taken along line 5b—5b of FIG. 5(a);

FIG. 5(c) is a sectional view taken generally along line 5b—5b of FIG. 5(a) illustrating the bushing coupled to the drive shaft;

FIG. 6(a) is a front view of the drive shaft according to one embodiment of the invention;

FIG. 6(b) is a side view of the drive shaft;

DETAILED DESCRIPTION OF THE PREFERRED EMBODIMENTS

Figure 1:
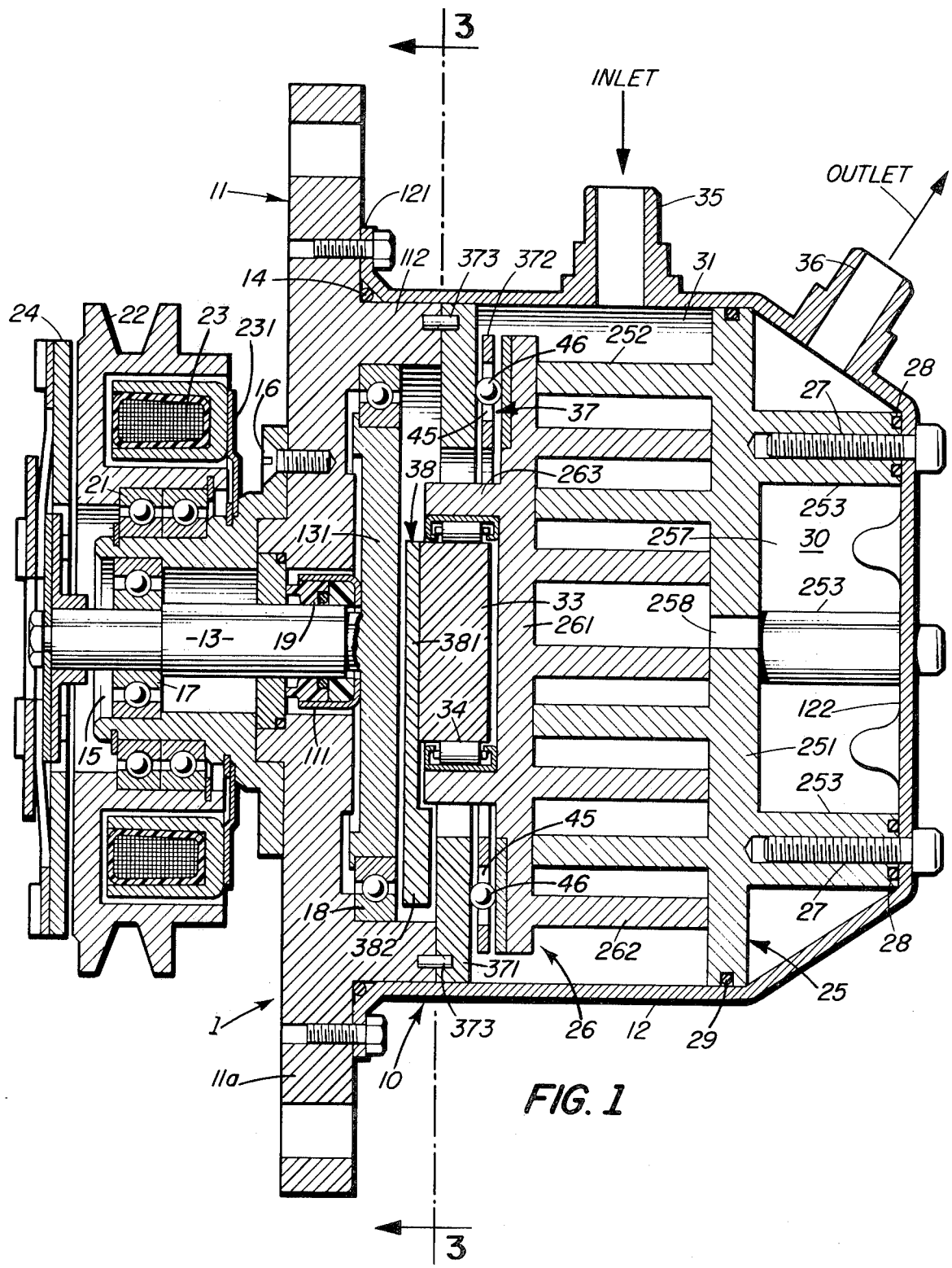
FIG. 1 is a vertical sectional view of a compressor unit according to one embodiment of this invention.

Referring to FIG. 1, a fluid displacement apparatus in accordance with an embodiment of the present invention, in particular, a scroll type refrigerant compressor 1 is shown. The compressor 1 includes a compressor housing 10 comprising a front end plate 11, and a cup shaped casing 12 which is disposed at an end surface of front end plate 11. An opening 111 is formed in the center of front end plate 11 for penetration or passage of a drive shaft 13. An annular projection 112 is formed in a rear end surface of front end plate 11 which faces cup shaped casing 12. The annular projection 112 is concentric with opening 111. Cup shaped casing 12 has a flange portion 121 which extends radially outward along an opening portion thereof. An inner surface of the opening portion of cup shaped casing 12 is fitted about an outer peripheral surface of annular projection 112. An end surface of flange portion 121 is fitted against the rear end surface of front end plate 11 and is fixed to front end plate 11 by a fastening means, for example, a plurality of bolts and nuts. The opening portion of cup shaping casing 12 is thereby covered by front end plate 11. A sealing member, such as an O-ring 14 is placed between front end plate 11 and cup shaped casing 12, to thereby form a seal along the mating surfaces of front end plate 11 and cup shaped casing 12. Front end plate 11 has an annular sleeve portion 15 projecting from the front end surface thereof for surrounding drive shaft 13. In the embodiment as shown in FIG. 1, sleeve portion 15 is formed separately from front end plate 11. Therefore, sleeve portion 15 is fixed to the front end plate 11 by screws 16, one of which is shown in FIG. 1. Alternatively, sleeve portion 15. may be formed integral with front end plate 11.

Drive shaft 13 is rotatably supported by sleeve portion 15 through a bearing 17 disposed within the front end portion of sleeve portion 15. Drive shaft 13 is formed with a disk rotor 131 at its inner end portion, and disk rotor 131 is rotatably supported by front end plate 11 through a bearing 18 disposed within an inner peripheral surface of annular projection 112. Therefore, drive shaft 13 is rotatably supported by the two bearings 17, 18. A shaft seal assembly 19 is assembled on drive shaft 13 within opening 111 of front end plate 11.

A pulley 22 is rotatably supported by a bearing 21 which is disposed on an outer peripheral surface of sleeve portion 15. An electromagnetic annular coil 23 is fixed to the outer surface of sleeve portion 15 by a support plate 231 and is received in an annular cavity of pulley 22. An armature plate 24 is elastically supported on the outer end of drive shaft 13 which extends from sleeve portion 17. A magnetic clutch comprising pulley 22, magnetic coil 23 and armature plate 24 is thereby formed. Thus, drive shaft 13 is driven by external drive power source, for example, an engine of a vehicle, through a rotation force transmitting mechanism, such as the magnetic clutch.

A fixed scroll member 25, an orbiting scroll member 26, a driving mechanism of orbiting scroll member 26, and a rotation preventing/thrust bearing mechanism of orbiting scroll member 26 are disposed in an inner chamber of cup shaped casing 12. The inner chamber is formed between the inner wall of cup shaped casing 12 and front end plate 11.

Fixed scroll member 25 includes a circular end plate 251, a wrap or spiral element 252 affixed to or extending from one side surface of circular plate 251, and a plurality of internally threaded bosses 253 axially projecting from the end surface of circular plate 251 opposite to the side thereof from which spiral element 252 extends. An axial end surface of each boss 253 is seated on the inner surface of an end plate portion 122 of cup shaped casing 12 and is fixed to end plate portion 122 by screws 27 which screw into boss 253 from the outside of end plate portion 122. First seal members 28 are disposed between the end surface of each boss 253 and the inner surface of end plate portion 122, to thereby prevent fluid leakage along screws 27. Circular plate 251 of fixed scroll member 25 partitions the inner chamber of cup shaped casing 12 into a rear or discharge chamber 30 in which bosses 253 are disposed and a front or suction chamber 31 in which spiral element 252 of fixed scroll member 25 is disposed. A second sealing means 29 is placed between the outer peripheral surface of circular plate 251 and the inner surface of cup shaped casing 12 to prevent leakage along the mating surfaces of the plate 251 and the casing 12.

Orbiting scroll member 26 is disposed in front chamber 31. Orbiting scroll member 26 also comprises a circular end plate 261 and a wrap or spiral element 262 extending from one side surface of circular plate 261. Spiral elements 252, 262 interfit at angular offset of 180° and a predetermined radial offset. At least a pair of fluid pockets are thereby defined between spiral elements 252, 262. Orbiting scroll member 26 is connected to the driving mechanism and to the rotation preventing/thrust bearing mechanism. These last two mechanisms effect orbital motion of orbiting scroll member 26 at a circular radius Ro by rotation by drive shaft 13, to thereby compress fluid passing through the compressor unit.

Generally, radius Ro of orbital motion is given by

[(pitch of spiral element)−2(wall thickness of spiral element)]×½

Figure 8:
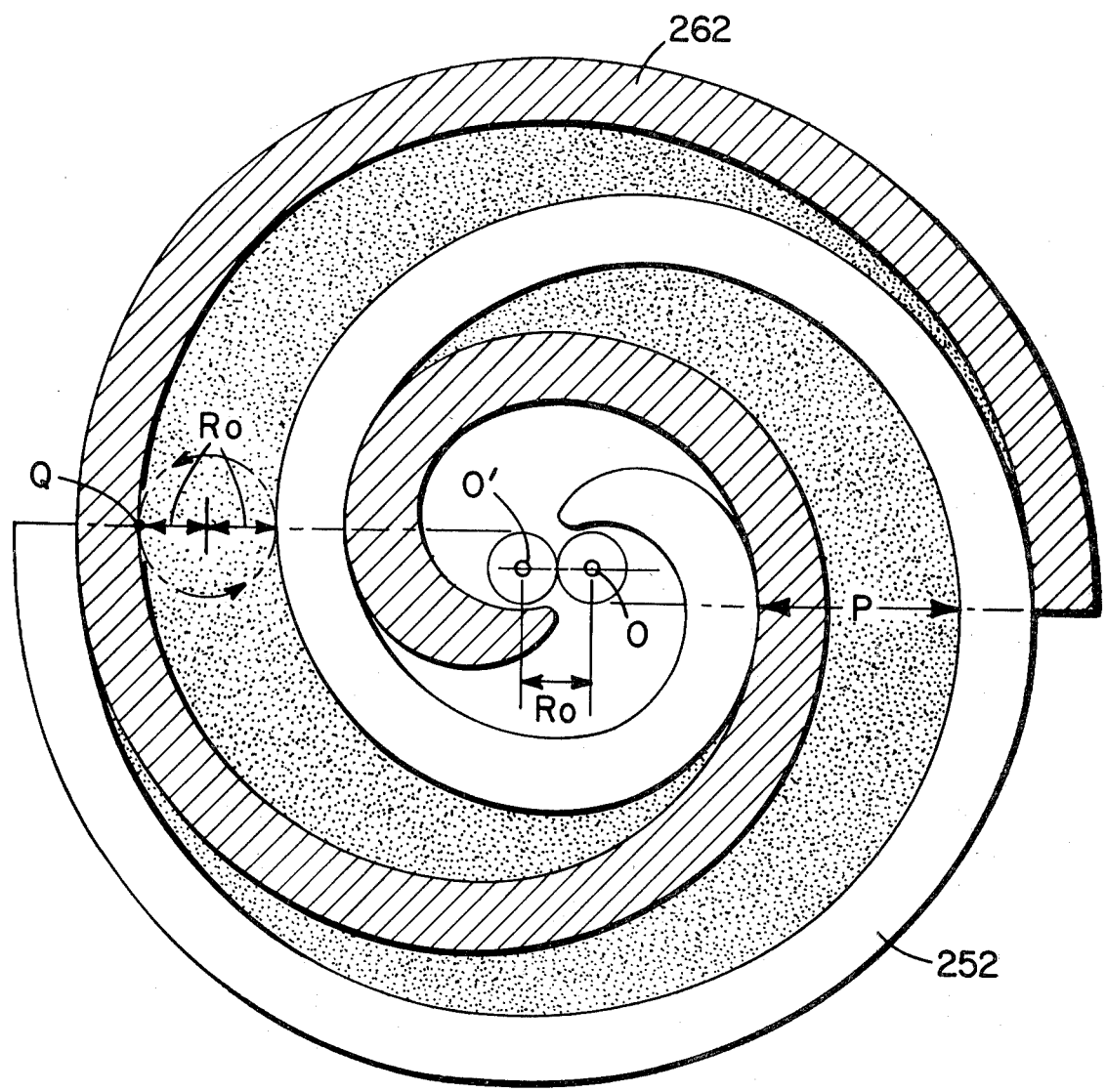
FIG. 8 is a diagrammatic sectional view illustrating the spiral elements of the fixed and orbiting scroll members.

As seen in FIG. 8, the pitch (P) of the spiral elements can be defined by $2\pi r_g$, where $r_g$ is the involute generating circle radius. The radius of orbital motion Ro is also illustrated in FIG. 8 as a locus of an arbitrary point Q on orbiting scroll member 26. The spiral element 262 is placed radially offset from the spiral element 252 of fixed scroll member 25 by the distance Ro. Thereby, orbiting scroll member 26 is allowed to undergo the orbital motion of a radius Ro by the rotation of the drive shaft 13. As the orbiting scroll member 26 orbits, line contact between both spiral elements 252, 262 shifts to the center of the spiral element along the surfaces of spiral elements. Fluid pockets defined between both spiral elements 252, 262 move to the center with a consequent reduction of volume, to thereby compress the fluid in the fluid pockets. Therefore, fluid or refrigerant gas, introduced into front chamber 31 from an external fluid circuit through an inlet port 35, is taken into the fluid pockets formed between both spiral elements 252, 262 from an outer end portion of the spiral elements. As orbiting scroll member 26 orbits, fluid in the fluid pockets is compressed, and the compressed fluid is discharged into rear chamber 30 from the fluid pocket adjacent the spiral elements center through a hole 254 which is formed through circular plate 251 at a position near the center of spiral element 252. The compressed fluid is thereafter discharged to the external fluid circuit through an outlet port 36.

Figure 2:
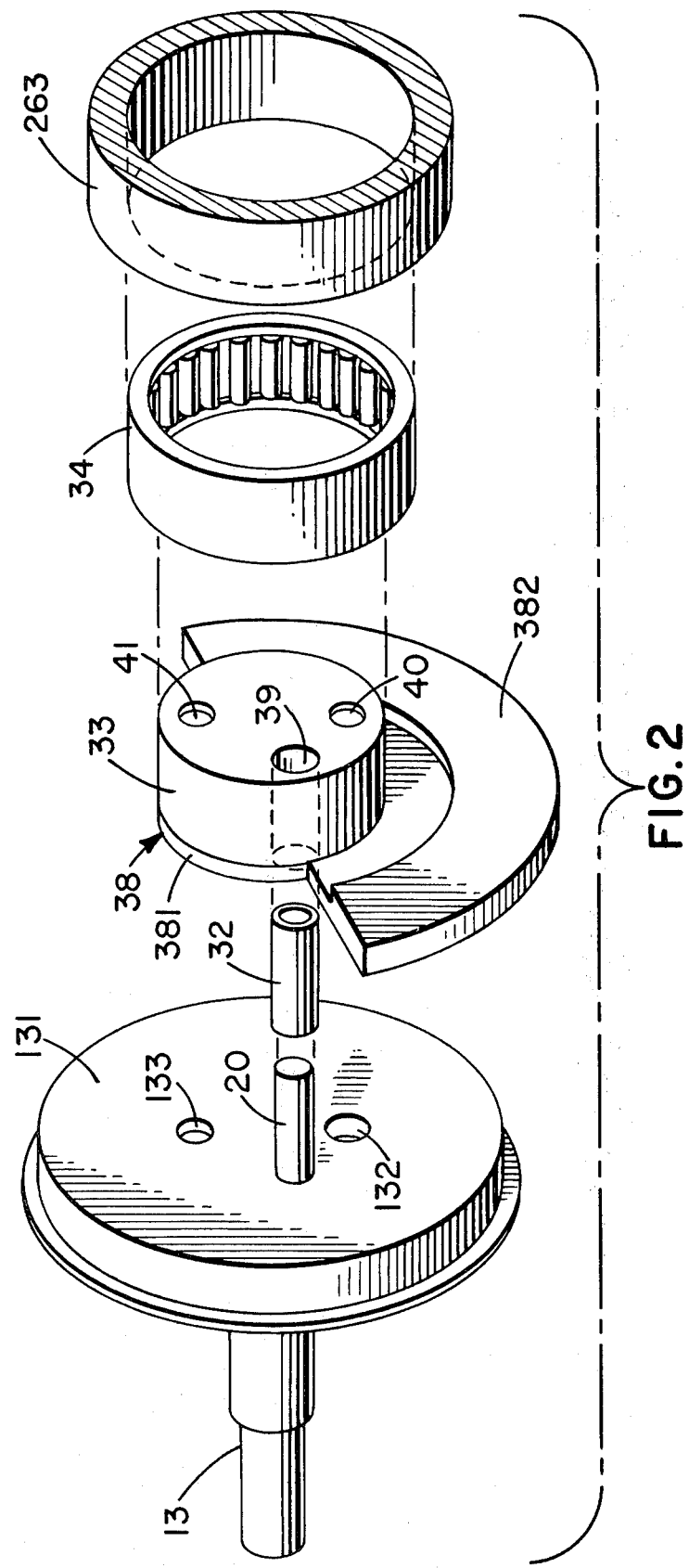
FIG. 2 is an exploded perspective view of a driving mechanism in the embodiment of FIG. 1.

Referring to FIGS. 1 and 2, the driving mechanism of orbiting scroll member 26 will be described. Drive shaft 13, which is rotatably supported by sleeve portion 15 through bearing 17, is formed with disk rotor 131. Disk rotor 131 is also rotatably supported by front end plate 11 through bearing 18. A crank pin or drive pin 20 projects axially from an axial end surface of disk rotor 131 and is radially offset from the center of drive shaft 13. Circular plate 261 of orbiting scroll member 26 is provided with a tubular boss 263 axially projecting from an end surface opposite to the side thereof from which spiral element 262 extends. A discoid or short axial bushing 33 is fitted into boss 263, and is rotatably supported therein by a bearing, such as a needle bearing 34.

A balance weight 38 is attached to an axial end surface of bushing 33. The balance weight 38 comprises an attachment portion 381 for attachment to the bushing 33 and a disc or ring shaped additional weight 382 which extends radially along a portion of peripheral surface of attachment portion 381. The configuration of attachment portion 381 conforms with the configuration of bushing 33. An eccentric hole 39 is, therefore, formed through bushing 33 and attachment portion 381 of balance weight 38 radially offset from the center of bushing 33. Drive pin 20 is fitted into eccentric hole 39 within which a bearing 32 may be applied. Bushing 33 is therefore driven by the revolution of drive pin 20 which is permitted to rotate in bearing 32.

Figure 3:
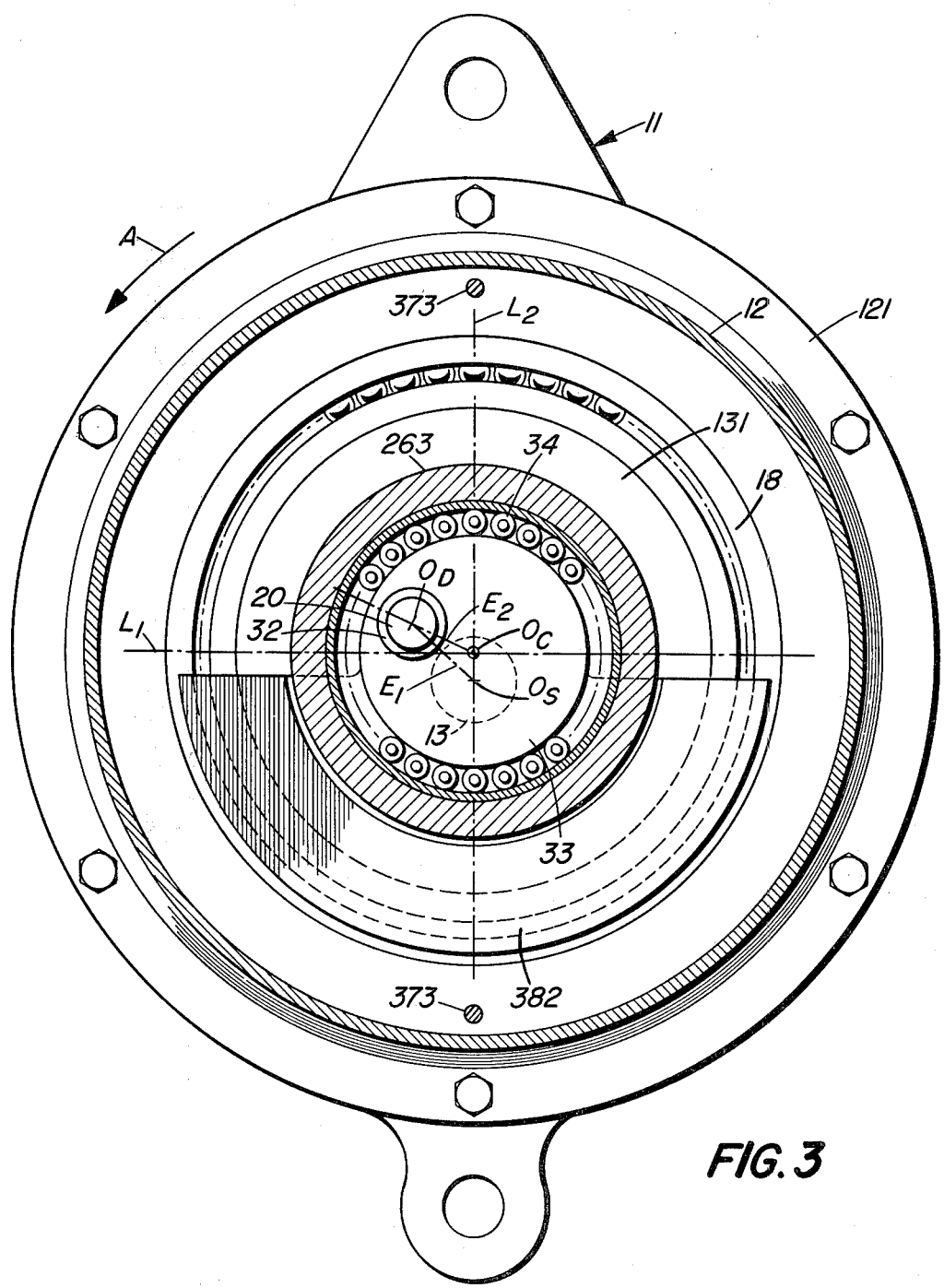
FIG. 3 is a sectional view taken generally along line 3—3 of FIG. 1 with an explanatory diagram of the motion of the eccentric bushing.

Respective placement of center Os of drive shaft 13, center Oc of bushing 33, and center Od of hole 39 and thus of drive pin 20, is shown in FIG. 3. In the position shown in FIG. 3, the distance between Os and Oc is the radius Ro of orbital motion, and when drive pin 20 is placed in eccentric hole 39, center Od of drive pin 20 is placed, with respect to Os, on the opposite side of a line $L_1$, which is through Oc and perpendicular to line $L_2$ through Oc and Os, and also beyond the line $L_2$ in direction of rotation A of drive shaft 13.

In this construction of driving mechanism, center Oc of bushing 33 is permitted to swing about the center Od of drive pin 20 at a radius $E_2$, as shown in FIG. 3. When drive shaft 13 rotates, a drive force is exerted at center Od to the left, and a reaction force of gas compression appears at center Oc to the right, both forces being parallel to line $L_1$. Therefore, the arm Od-Oc swings outwardly by creation of the moment generated by the two forces. Spiral element 262 of orbiting scroll member 26 is thereby forced toward spiral element 252 of fixed scroll member 25, and the center of orbiting scroll member 26 orbits with the radius Ro around center Os of drive shaft 13. The rotation of orbiting scroll member 26 is prevented by a rotation preventing/thrust bearing mechanism, described more fully hereinafter, whereby orbiting scroll member 26 only orbits and does not rotate. The fluid pocket moves because of the orbital motion of orbiting scroll member 26, to thereby compress the fluid.

When fluid is compressed by orbital motion of orbiting scroll member 26, a reaction force, caused by the compression of the fluid acts on spiral element 262. The reaction force gives rise to a presser force which acts at the line contact between both spiral elements 252, 262 to urge spiral element 262 into engagement with spiral element 252, whereby a seal of the fluid pockets is attained. In addition, center Oc of bushing 33 is rotatable around center Od of drive pin 20, therefore, if a pitch of a spiral element or wall thickness of a spiral element has a dimensional error, due to manufacturing inaccuracy or wear, distance Oc-Os changes to correspond to the error. Orbiting scroll member 26 thereby moves smoothly along the line contacts between the spiral elements.

Referring to FIG. 4 and FIG. 1, a rotation preventing mechanism 37, which is formed integral with a thrust bearing mechanism, will be described. Rotation preventing/thrust bearing mechanism 37 is disposed around boss 263 and is comprised of a fixed ring 371 and an Oldham ring 372. Fixed ring 371 is secured to the axial end surface of annular projection 112 of front end plate 11 by a pin 373. Fixed ring 371 is provided with a pair of keyways 371a, 371b in its axial end surface facing orbiting scroll member 26. Oldham ring 372 is disposed in a hollow space between fixed ring 371 and circular plate 261 of orbiting scroll member 26. Oldham ring 372 is provided with a pair of keys 372a, 372b on the surface facing fixed ring 371, which are received in keyways 371a, 371b. Therefore, Oldham ring 372 is slidable in the radial direction by the guide of keys 372a, 372b within keyways 371a, 371b. Oldham ring 372 is also provided with a pair of keys 372c, 372d on its opposite surface. Keys 372c, 372d are arranged along a diameter perpendicular to the diameter along which keys 372a, 372b are arranged. Circular plate 261 of orbiting scroll member 26 is provided with a pair of keyways (in FIG. 4 only one keyway 261a is shown; the other keyway is disposed diametrically opposite to keyway 261a) in the surface facing Oldham ring 372, in which are received keys 372c, 372d. The keyways in circular plate 261 are located outside the diameter of boss 263. Therefore, orbiting scroll member 26 is slidable in a radial direction by guide of keys 372c, 372d within the keyways of circular plate 261.

Accordingly, orbiting scroll member 26 is slidable in one radial direction with Oldham ring 372, and is independently slidable in another radial direction which is perpendicular to the first radial direction. Therefore, orbiting scroll member 26 is prevented from rotating, but is permitted to move in two radial directions perpendicular to one another.

In addition, Oldham ring 372 is provided with a plurality of equiangularly spaced holes 45, which are formed in an axial direction. Bearings, such as balls 46, each having a diameter which is greater than the thickness of Oldham ring 372, are retained in holes 45. Balls 46 contact and roll on the surface of fixed ring 371 and circular plate 261. Therefore, the axial thrust load from orbiting scroll member 26 is supported on fixed ring 371 through bearings 46.

In this construction, if bushing 33 is not provided with balance weight 38, a centrifugal force $F_1$ caused by orbiting motion of orbiting scroll member 26, bearing 34 and bushing 33 is added to the presser force of spiral element 262 acting on spiral element 252 of fixed scroll member 25. Therefore, the contact force between the spiral elements 252, 262 would also be increased. Friction force between spiral elements 252, 262 would thereby be increased, and wearing of both spiral elements would be increased.

Therefore, if bushing 33 is provided with balance weight 38, centrifugal force $F_1$ can be cancelled by a centrifugal force $F_2$ of the balance weight. The mass of the balance weight 38 is selected so that the centrifugal force $F_1$ is equal in magnitude to the centrifugal force $F_2$ and located so that the centrifugal forces $F_1$ and $F_2$ are opposite in direction. Wear of both spiral elements will thereby also be decreased; the sealing force of the fluid pockets will be attained by the contact between the spiral elements and the orbiting scroll member will move smoothly.

Figure 7:
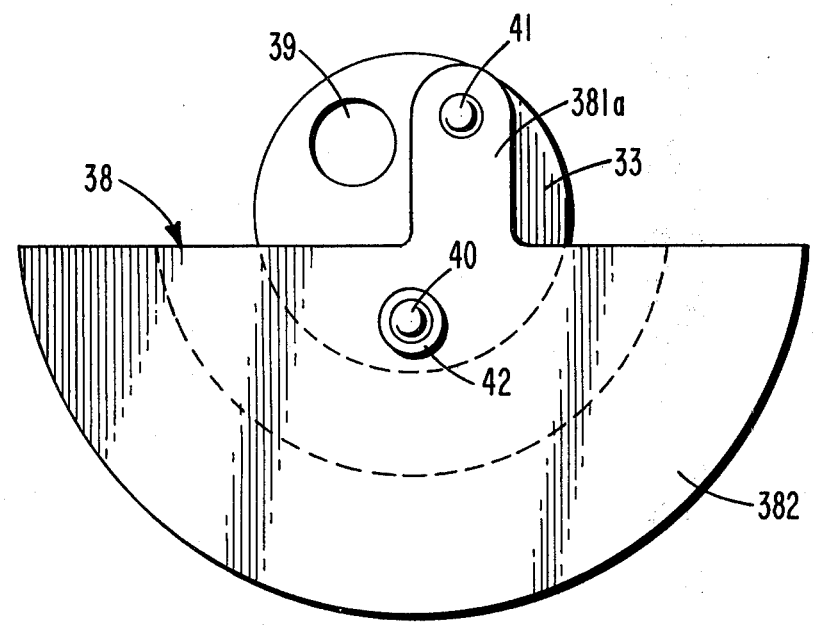
FIG. 7 is a front view of the bushing and balance weight according to another embodiment of this invention.

As shown in FIGS. 5a, 5b and 5c balance weight 38 is formed separately from bushing 33. The attachment portion 381 of balance weight 38 is fixed to the axial end surface of bushing 33 by at least two rivets 40, 41. The configuration of the attachment portion 381 is formed flowing the configuration of bushing 33, therefore, attachment portion 381 has a hole for the passage of drive pin 20. However, the configuration of attachment portion 381 does not necessarily have to follow the configuration of bushing 33, but may be formed as shown in FIG. 7 with an extending part 381a to be fixed to bushing 33. Extending part 381a is smaller than the bushing 33 for reducing the weight of the driving mechanism. In this construction, the head of rivets 40, 41 project axially from the end surface of balance weight 38. Therefore, indentations 132, 133 are formed in the axial end surface of disk rotor 131 for receiving the head of rivets 40, 41 with a clearance between the inner surface of indentation and the rivet, as shown in FIG. 5c. This two-piece construction of the balance weight 38 and bushing 33 allows the balance weight 38 and the bushing 33 to be made of different materials, while keeping the production technique simple. For example, the bushing 33 can be made of an anti-wear material because it must rotate within needle bearing 33, while the balance weight 38 can be made of another less expensive material.

Bushing 33 is freely rotatable on drive pin 20, so that bushing 33 is movable vertically, but if bushing 33 would be fully rotatable around drive pin 20, the balance weight would interfere with interior wall of the housing. Therefore, a mechanism is provided to limit the swing angle of bushing 33 around drive pin 20.

One of the rivets 40 fixes an annular steel ring 42 together with balance weight 38 to the bushing 33, as shown in FIGS. 5a, 5b, and 5c. Steel ring 42 is disposed in the indentation 132 of disk rotor 131 with a selected amount of clearance to permit only a predetermined amount of swing of the bushing 33 and the balance weight 38 about the drive pin 20. Therefore, the swing angle of bushing 33 around drive pin 20 is limited by the steel ring 42 disposed in indentation 132. The steel ring 42 has a generally flat outer circumferential surface and the indentation 132 has a generally flat inwardly facing circumferential surface. The flat surfaces preclude slippage of the ring 42 out of the indentation 132.

This invention has been described in detail in connection with the preferred embodiment, but this is an example only and this invention is not restricted thereto. It will be easily understood by those skilled in the art that other variations and modifications can be easily made within the scope of the invention.

I claim:

1. In a coupling device for coupling a rotatable drive shaft to an orbiting member of an orbiting piston type fluid displacement apparatus through a drive pin disposed eccentrically of and driven by the drive shaft and rotatably received within a hole in a bushing, the bushing being rotatably carried in a boss extending from the orbiting member, a counterweight assembly comprising an attachment portion for attachment to the bushing and a balance weight portion having a mass to generate a centrifugal force of a magnitude to cancel the centrifugal force generated by the orbital motion of the orbiting parts of the apparatus, fastening means for attaching said attachment portion of said counterweight assembly in a position such that the centrifugal force generated by the motion of said balance weight portion is in a direction opposite to the centrifugal force generated by the orbiting parts of the apparatus, the center of the drive pin being located on an opposite side to a center of the drive shaft with regard to a straight line, which passes through the center of the bushing and is perpendicular to a connecting line passing through the center of the drive shaft and the center of the bushing, the center of the drive pin also being beyond the connecting line in the direction of the rotation of the drive shaft, and means for limiting the angle which the bushing and counterweight assembly can swing about the axis of the drive pin, said limiting means including a portion of said fastening means extending from an end surface of said attachment portion of said counterweight assembly and an indentation formed in an end surface of the drive shaft for receiving said portion of said fastening means with an amount of clearance sufficient to permit a predetermined amount of swing of the bushing and counterweight assembly about the axis of the drive pin.

2. A counterweight assembly as claimed in claim 1, including a hole which is formed through said attachment portion and is aligned with the hole in the bushing for reception of the drive pin.

3. A counterweight assembly as claimed in claim 1 wherein said portion of said fastening means includes a disc or ring member for contacting an inner circumferential surface of said indentation.

4. A scroll type fluid displacement apparatus comprising:
a housing having a fluid inlet port and outlet port;
a fixed scroll member fixedly disposed relative to said housing and having an end plate from which a first spiral wrap extends into the interior of said housing;
an orbiting scroll member having an end plate from which a second spiral wrap extends, said first and second spiral wraps interfitting at an angular and radial offset to make a plurality of line contacts defining at least one pair of sealed off fluid pockets;

a driving mechanism operatively connected to said orbiting scroll member comprising a drive shaft rotatably supported by said housing, a drive pin eccentrically projecting from an end portion of said drive shaft, a bushing having a hole for receiving said drive pin and being rotatably carried in a boss extending from said end plate of said orbiting scroll member; and a counterweight assembly attached to the end surface of said bushing comprising an attachment portion for attachment to said bushing by a fastening element, a balance weight portion having a mass to generate a centrifugal force of a magnitude to cancel the centrifugal force generated by the orbital motion of the orbiting parts of the apparatus, and means for limiting the angle which the bushing and counterweight assembly can swing about the axis of said drive pin, said limiting means including a portion of said fastening element extending from an end surface of said attachment portion of said counterweight assembly and an indentation formed in an end surface of said drive shaft for receiving said portion of said fastening element with an amount of clearance to permit a predetermined amount of swing of said bushing and counterweight assembly about the axis of said drive pin.

* * * * *

UNITED STATES PATENT AND TRADEMARK OFFICE
CERTIFICATE OF CORRECTION

PATENT NO. : 4,439,118
DATED : March 27, 1984
INVENTOR(S) : Takayuki Iimori

It is certified that error appears in the above—identified patent and that said Letters Patent is hereby corrected as shown below:

In Column 7, line 38, change "flowing" to --following--.

Signed and Sealed this

Tenth Day of July 1984

[SEAL]

Attest:

GERALD J. MOSSINGHOFF

Attesting Officer  Commissioner of Patents and Trademarks